Nov. 6, 1962  A. BRUEDER  3,062,199
COMBUSTION ENGINE SYSTEM
Filed Nov. 25, 1957  2 Sheets-Sheet 1

Inventor
Antoine Brueder
By his attorneys

Howson and Howson,

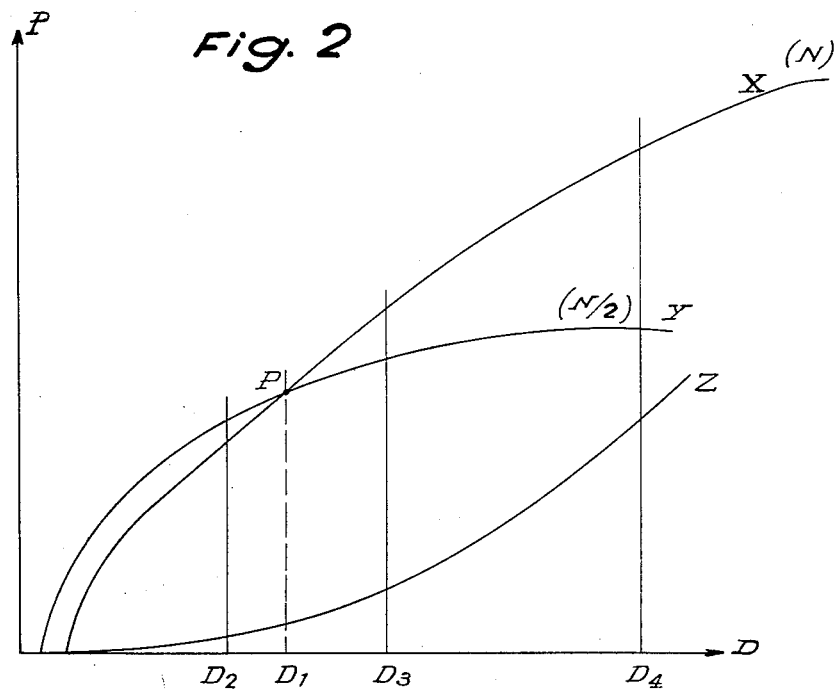
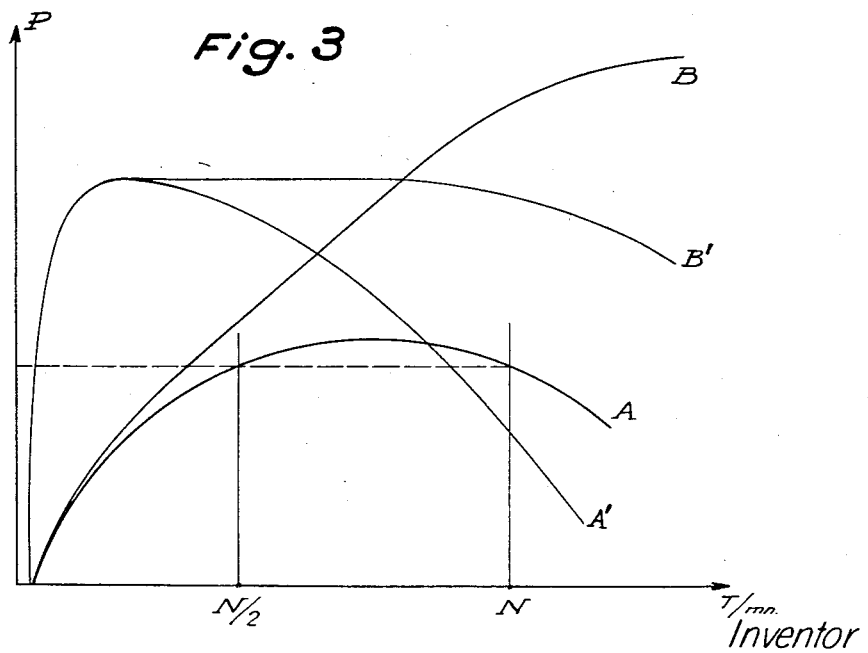

3,062,199
COMBUSTION ENGINE SYSTEM
Antoine Brueder, Paris, France, assignor to Societe Anonyme Andre Citroen, Paris, France
Filed Nov. 25, 1957, Ser. No. 698,643
9 Claims. (Cl. 123—65)

An ideal propulsion system for automotive vehicles should develop a high torque at low velocities. This is the case for a series-excitation electric motor; internal combustion engines on the other hand put out a substantially constant torque and hence require the use of speed change gear in conjunction therewith.

A satisfactory solution to this problem has been developed in connection with the turbine. This lies in providing two turbines free of any mechanical connection between them, with the first turbine operating the vehicle wheels while the other operates a compressor supplying combustion air or exhaust gases for the first turbine. The operating characteristics obtained in this way are well suited to automotive vehicles, viz. a drive torque which increases as the rotational speed decreases and which in starting conditions may exceed twice the value corresponding to the maximum power output.

It is an object of the present invention to provide a propulsion system wherein the drive unit is an internal combustion engine and which exhibits the desirable characteristics indicated above.

The engine system comprises a two-cycle engine having fuel injecting means and electrical igniting means and an auxiliary compressor group including an air compressor and a second engine independent of the first or main engine. The compressor is employed to feed combustion and scavenging air to said main engine and has a maximum rate of air discharge in the range from about 0.8D to 1.4D, where D is the volume of air for which the main engine is substantially saturated with air at an engine speed equal to one half the maximum engine speed. Since the rate of scavenging airflow delivered by the compressor group, is constant regardless of the speed of the two-cycle motor, the scavenging ratio of the engine will increase at decreasing r.p.m. values.

Now, it is known that the power output of a two-cycle engine, for a given r.p.m. value, is an increasing function of the scavenging ratio, i.e. the drive torque rises with the scavenging ratio.

As a result, in a propulsion system according to the invention the engine torque increases as the motor speed decreases and the power output therefore remains substantially constant over a very wide range of speeds.

The propulsion system of the invention accordingly, is especially well suited in connection with automobile drives and will then require only a two-speed change gear where a four-speed gear would be required if a conventional combustion engine were to be used.

The two-cycle motor has a constant power output only assuming that the scavenging air flow rate is constant. This is because the power output increases with the air flow so that the power developed by the two-cycle motor can be controlled by varying the scavenging air ratio.

In another connection, when the scavenging rate increases the efficiency of the scavenging action drops, that is, the amount of air used for combustion rises, but the proportion of the air which flows through the engine without being effectively used for combustion, in terms of the total amount of air, also increases.

Cooling is therefore improved and the knocking tendency in the case of an explosion engine is, consequently, not substantially increased by the increase in scavenging ratio. The particular compression ratio which is best suited for high speeds can thus be retained at the lower speeds, despite the great increase in mean pressure which results from the increase in scavenging ratio.

The auxiliary compressor set may comprise a compressor driven by an auxiliary internal combustion engine. This engine may be a two- or a four-cycle engine.

Alternatively the auxiliary set may comprise a compressor driven by a gas turbine.

The auxiliary motor whether of the internal combustion or the turbine type, may be used to drive the D.-C. generator supplying electric power for the ancillary services of the vehicle. This generator in turn may be used to start the auxiliary motor; it need simply be supplied with battery current so that it will operate as a motor.

Means may be provided for momentarily establishing a mechanical connection between the auxiliary motor and the main two-cycle engine, whereby it will be possible to start the main engine from the auxiliary motor.

In case the compressor is driven by a gas turbine, the latter may be fed at least in part with the exhaust gases from the main engine; thus part of the heat losses from the main engine will be recovered.

Two forms of embodiment of the system of the invention will be described hereinafter by way of example but not of limitation with reference to the accompanying drawings wherein:

FIGS. 2 and 3 illustrate explanatory graphs;

Figure 1:
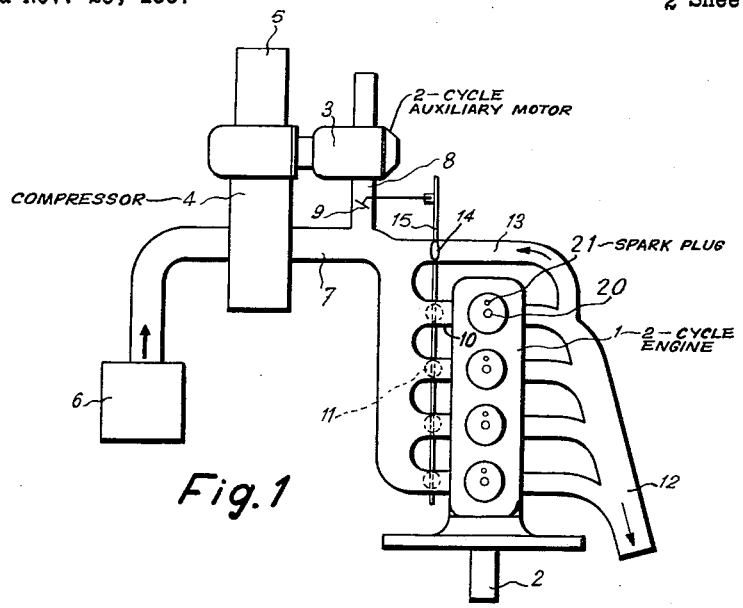
FIG. 1 is a diagrammatic showing of a first embodiment.

As shown in FIG. 1, the engine system comprises a two-cycle, four-cylinder engine 1 having an output shaft shown at 2. Fuel is supplied to the engine by way of injectors 20 and the mixture is ignited by spark plugs or igniters 21. The system further includes a compressor group comprising an auxiliary motor 3 of two-cycle reciprocating type which drives a compressor 4 and a D.-C. generator 5. The filter 6 of the compressor 4 may operate as an intake muffler.

The outlet conduit 7 of the compressor 4 is connected with the intake of the auxiliary motor 3 by way of a conduit 8 having a throttle valve 9 therein. The compressor outlet pipe 7 is furthermore connected with the respective intake pipes 10 of main engine 1, having the throttle valves 11 interposed therein, and moreover with an exhaust pipe 12 by way of a conduit 13 in which is interposed a throttle valve 14. The valve 14 is secured on a common shaft 15 with the valves 11 so that the valve 14 will be opened as the valves 11 are closed and vice versa.

The motor 3 can be mechanically coupled with the engine 1 through suitable means not shown in the drawing.

To start engine system the generator 5 is connected with a battery and driven as a motor. The rotation of the generator starts up the compressor motor 3. With the motor 3 in operation, it is momentarily coupled mechanically with the engine 1 to start the engine.

The throttle valve 9 regulates the airflow to the auxiliary motor 3 and hence the power output of that motor. With that valve wide open the output of compressor motor 3 is a maximum and so is its speed. The rate of airflow supplied by compressor 4 therefore also is a maximum and so is the power developed by the main engine 1.

Conversely closing the throttle valve 9 of the auxiliary motor will reduce the power and speed of the auxiliary motor, hence the airflow to and power output from the main engine 1. Beyond a given point the rod 15 is also actuated so as to close the throttle valves 11 and open throttle valve 14 so that the scavenging ratio in the main engine 1 will drop as will also the power developed by this engine, as described in my copending application Serial No. 624,884, filed November 28, 1956. This is now Patent 2,988,070, issued June 3, 1961.

With the throttle valves 9, 11 and 14 in a given position, the airflow through main engine 1 is substantially independent of its rate of rotation and the power developed by it will then vary but very little with speed.

This is illustrated by the curves X and Y in FIG. 2, which show the variations of the power output P of a two-cycle engine as a function of the compressor discharge rate D. Curve X corresponds to the maximum speed $N/2$ while curve Y corresponds to speed N. Also shown in the figure is a curve Z indicating the power taken up by the compressor 4. While it would have been more accurate to indicate two curves for each value of speed, actually the two curves are so nearly the same that a satisfactory approximation is obtained with a single curve. The power taken up varies substantially as the third power of the air flow rate.

It will be seen from the drawing that curves X and Y have a common point P, indicating that there exists a value of the scavenging flow D such that the power output P of the engine is the same at maximum speed N and at the speed $N/2$.

The maximum rate of scavenging flow (when auxiliary engine valve 9 is wide open) is so determined as to obtain substantially the value $D_1$ corresponding to point P. The power output curve A of engine 1 as a function of r.p.m. is shown in FIG. 3. It will be seen that the power output is substantially a constant over a wide range of speeds. At the same time, the power taken up by the scavenging operation (as given by curve Z) remains at a reasonably low value of about 7%. Actually the flow rate D may be varied substantially from $0.8D_1$ to $1.4D_1$, corresponding to a range of from 5% to 15% for the power output taken up by scavenging operation, in terms of the engine power output.

With the flow rate D held within the above indicated range, the power output will vary but little with r.p.m. However, if the flow rate is substantially increased over said range, the power output will increase markedly with speed. This is shown by curve B which corresponds to the flow rate $D_4$ on FIG. 1, at which the scavenging power take-up is 40% of the maximum output of engine 1. Such a flow rate is well within the range of the outputs used in conventional two-cycle diesel engines, which require high scavenging ratios for removing the spent gases at all speeds.

This engine 1 while less powerful than it would be were the flow rate high enough to provide an output curve such as B, is very well suited for the powering of automobiles since in such application the most important factor is the power output at low speeds. It moreover is more economical, since the power output taken up by scavenging is only one sixth of the corresponding value in an engine operated according to curve B.

An engine corresponding to curve B would have twice the power output of a four-cycle engine of equal cylinder capacity. An engine according to the invention, while having a low scavenging power requirement, has a power output substantially equal to that of a four-cycle engine of equal cylinder capacity, and, at low r.p.m. values, its output torque is substantially twice as high. This is shown by torque curves A' and B' corresponding to output curves A and B.

In the engine 1, at low speeds, the scavenging flow rate is superabundant, so that a large amount of air is passed to exhaust without being utilized to produce work, but only serves to cool the engine.

At the speed $N/2$, the engine is approximately saturated with air in view of the value selected for the flow rate. At high speeds the scavenging flow rate is relatively low so that a considerable proportion of spent gases is present in the cylinders. It is the waste of scavenging air at low engine speeds which entails the requirement for an injection type of fuel feed, since carburetor feed would result in a substantial loss of fuel.

Figure 4:
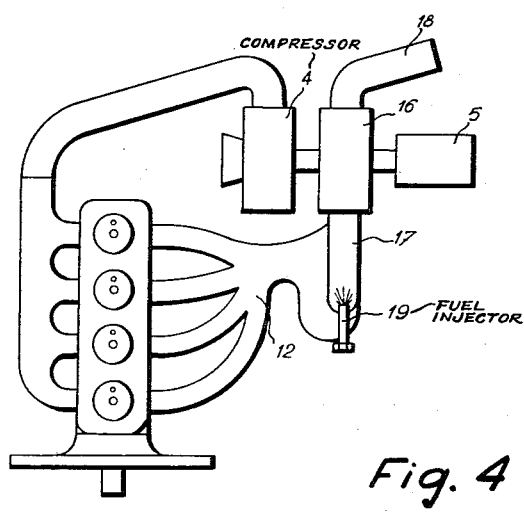
FIG. 4 is a diagrammatic showing of a second embodiment.

In the form of embodiment of FIG. 4, the compressor 4 is driven by a turbine 16 which likewise actuates the generator or dynamo 5. The exhaust pipe 12 of main engine 1 connects with a combustion chamber 17 beyond which is a turbine 16 having an exhaust illustrated at 18. The combustion chamber 17 contains an injector nozzle 19 the discharge rate of which is controlled through known means in response to the speed of turbine 16.

With the system in operation the exhaust gases from engine 1 operate the turbine 16 which drives the compressor 4. At the maximum speed of rotation of the main engine 1, there will only be a negligibly small heat input into the combustion chamber 17 from the entire operating assembly.

If the speed of engine 1 is reduced, the rate of discharge of exhaust gases also drops so that the speed of turbine 16 will tend to slow down. However a certain amount of fuel will then be admitted through nozzle 19 into the combustion chamber 17; this fuel is able to burn owing to the excess of air contained in the exhaust gases, so that operating temperature of turbine 16 will rise up again unitl the turbine has resumed its initial rotational speed.

Thus the systems of FIGS. 1 and 4 both operate in an equivalent manner.

It will be understood that the invention is not to be limited to the forms of embodiment described and illustrated, but covers all modifications thereof.

This application is a continuation-in-part of my copending application Serial No. 624,669, now abandoned.

What I claim is:

1. An internal combustion engine system comprising a two-cycle multi-cylinder main engine having fuel injection means, electrical ignition means, exhaust passages, and inlet passages for scavenging and combustion air, in combination with auxiliary compressor means feeding combustion and scavenging air to said main engine, a second engine independent of the main engine driving said compressor independently, said compressor feeding combustion and scavenging air to said main engine at a rate from about 0.8D to about 1.4D, where D is the volume of air for which the main engine is substantially saturated with air at an engine speed equal to one half the maximum engine speed.

2. An internal combustion engine system comprising a two-cycle multi-cylinder main engine having fuel injection means, electrical ignition means, exhaust passages, and inlet passages for scavenging and combustion air, in combination with auxiliary compressor means feeding combustion and scavenging air to said main engine, a second engine independent of the main engine driving said compressor independently, said compressor feeding combustion and scavenging air to said main engine at a rate from about 0.8D to about 1.4D, where D is the volume of air for which the main engine is substantially saturated with air at an engine speed equal to one half the maximum engine speed, throttle valve means in said air inlet passages, throttle valve means between said compressor means and said second engine controlling the air flow to said second engine, and a connection between the throttle means for the second engine and the throttle means for the first engine to close the latter when the former is closed.

3. An engine system as claimed in claim 1 in which the second engine is an internal combustion engine.

4. An engine system as claimed in claim 2 in which the second engine is an internal combustion engine.

5. An internal combustion engine system comprising a two-cycle multi-cylinder main engine having fuel delivery means, electrical ignition means, exhaust passages and inlet passages for scavenging and combustion air, in combination with auxiliary compressor means feeding combustion and scavenging air to said main engine, a second engine independent of the main engine driving said compressor independently, means causing said compressor to deliver air to the main engine at a substantially constant rate for a predetermined power setting of the main engine, whereby the main engine torque increases with an increase of the scavenging ratio resulting from a reduction of main engine speed, and whereby for said predetermined setting the main engine power remains substantially constant over a large range of main engine speeds.

6. An internal combustion engine as claimed in claim 5 having means connecting the compressor to the second engine to supply combustion and scavenging air to the second engine, and throttle valve means in said connecting means controlling the air supply to said second engine.

7. An internal combustion engine as claimed in claim 5 wherein the air-supply means includes throttle valve means controlling inlet of combustion and scavenging air to said main and second engines, and a connection between the inlet throttle means for the second engine and the inlet throttle means for the first engine to close the latter when he former is closed.

8. An internal combustion engine system as claimed in claim 5 having a connection between the output of said compressor and the exhaust of said main engine, and throttle valve means in said connection.

9. An internal combustion engine as claimed in claim 7 having a connection between the output of said compressor and the exhaust of said main engine, and throttle valve means in said connection, and means connecting the valve means of the connection between the compressor and second engine to the inlet valve means of the first and second engines so that as the latter close the former will open and vice versa.

References Cited in the file of this patent
UNITED STATES PATENTS

| | | |
|---|---|---|
| 2,379,455 | Prince | July 3, 1945 |
| 2,403,398 | Reggio | July 2, 1946 |
| 2,503,289 | Nettel | Apr. 11, 1950 |
| 2,583,882 | Ricardo | Jan. 29, 1952 |
| 2,654,991 | Nettel | Oct. 12, 1953 |
| 2,724,371 | Mallory | Nov. 22, 1955 |
| 2,769,303 | Lucia et al. | Nov. 6, 1956 |
| 2,879,640 | Huber | Mar. 31, 1959 |

FOREIGN PATENTS

| | | |
|---|---|---|
| 184,378 | Switzerland | Aug. 1, 1936 |

OTHER REFERENCES

"Diesel Engines Theory and Design" (Degler), published by American Technical Society (Chicago, U.S.A.), 1940; pp. 115–117 relied on.